United States Patent
Kho et al.

(10) Patent No.: US 12,124,033 B2
(45) Date of Patent: Oct. 22, 2024

(54) HOLOGRAPHIC LIGHT GUIDE PLATE

(71) Applicant: LG Chem, Ltd., Seoul (KR)

(72) Inventors: Eun Ho Kho, Daejeon (KR); Jae Jin Kim, Daejeon (KR); Bu Gon Shin, Daejeon (KR); Dae Han Seo, Daejeon (KR); Min Soo Song, Daejeon (KR)

(73) Assignee: LG Chem, Ltd., Seoul (KR)

( * ) Notice: Subject to any disclaimer, the term of this patent is extended or adjusted under 35 U.S.C. 154(b) by 322 days.

(21) Appl. No.: 17/607,196

(22) PCT Filed: Oct. 6, 2020

(86) PCT No.: PCT/KR2020/013586
§ 371 (c)(1),
(2) Date: Oct. 28, 2021

(87) PCT Pub. No.: WO2021/071210
PCT Pub. Date: Apr. 15, 2021

(65) Prior Publication Data
US 2022/0221719 A1 Jul. 14, 2022

(30) Foreign Application Priority Data
Oct. 7, 2019 (KR) .......................... 10-2019-0124013

(51) Int. Cl.
G02B 27/01 (2006.01)
F21V 8/00 (2006.01)
G02B 5/32 (2006.01)

(52) U.S. Cl.
CPC .......... *G02B 27/0103* (2013.01); *G02B 5/32* (2013.01); *G02B 6/0023* (2013.01); *G02B 6/005* (2013.01); *G02B 27/0101* (2013.01)

(58) Field of Classification Search
CPC .......... G02B 27/0103; G02B 27/0101; G02B 27/0179; G02B 27/286; G02B 27/4272;
(Continued)

(56) References Cited

U.S. PATENT DOCUMENTS 6,580,529 B1 * 6/2003 Amitai ............... G02B 27/0944
359/13
10,247,943 B1 * 4/2019 Yu ....................... G02B 27/0176
(Continued)

FOREIGN PATENT DOCUMENTS

CN 104423042 A 3/2015
CN 102928981 B 8/2016
(Continued)

OTHER PUBLICATIONS

International Search Report for Application No. PCT/KR2020/013586 mailed Jan. 20, 2021, pp. 1-3.
(Continued)

*Primary Examiner* — Stephone B Allen
*Assistant Examiner* — Jyotsna V Dabbi
(74) *Attorney, Agent, or Firm* — Lerner David LLP

(57) ABSTRACT

A holographic waveguide includes a light guide unit configured to guide lights; a first holographic optical element disposed on one surface or the other surface of the light guide unit and configured to diffract an input light; a second holographic optical element disposed on any one of the one surface and the other surface, and configured to receive a light diffracted by the first holographic optical element and to direct a part of the received light to the other one of the one surface and the other surface; a third holographic optical element disposed on a surface, and configured to receive diffracted lights by the second holographic optical element and to guide the lights; and a fourth holographic optical element configured to receive a diffracted light by the third holographic optical element, and to allow the light to be output from the light guide unit.

6 Claims, 4 Drawing Sheets

(58) Field of Classification Search
CPC ............ G02B 27/0081; G02B 27/0172; G02B 27/017; G02B 27/283; G02B 2027/0105; G02B 2027/0125; G02B 2027/0123; G02B 2027/0174; G02B 2027/0178; G02B 2027/0118; G02B 2027/0127; G02B 5/32; G02B 6/0023; G02B 6/005; G02B 6/0035; G02B 6/0076; G03H 1/0005; G03H 2001/2239; G03H 2001/261; G03H 2001/2615; G03H 2223/16; G03H 2223/23; G03H 2223/17; G03H 2270/00; F21S 43/235
USPC .......................................................... 359/13
See application file for complete search history.

(56) References Cited

U.S. PATENT DOCUMENTS

| | | | |
|---|---|---|---|
| 10,274,660 | B2 | 4/2019 | Dimov et al. |
| 11,320,571 | B2 * | 5/2022 | Brown ................ G02B 6/0076 |
| 2006/0126181 | A1 | 6/2006 | Levola |
| 2011/0026128 | A1 | 2/2011 | Baker et al. |
| 2014/0055830 | A1 | 2/2014 | Pyun et al. |
| 2015/0062715 | A1 | 3/2015 | Yamada et al. |
| 2016/0116739 | A1 | 4/2016 | TeKolste et al. |
| 2016/0282615 | A1 | 9/2016 | Yokoyama |
| 2017/0131545 | A1 | 5/2017 | Wall et al. |
| 2017/0131546 | A1 | 5/2017 | Woltman et al. |
| 2017/0235144 | A1 | 8/2017 | Piskunov et al. |
| 2018/0095201 | A1 | 4/2018 | Melli et al. |
| 2018/0210205 | A1 | 7/2018 | Grey et al. |

FOREIGN PATENT DOCUMENTS

| | | | | |
|---|---|---|---|---|
| CN | 107632406 | A | | 1/2018 |
| EP | 1068548 | B1 | | 11/2003 |
| JP | 2002162598 | A | * | 6/2002 ......... G02B 27/0081 |
| JP | 2008064914 | A | | 3/2008 |
| JP | 2008523435 | A | | 7/2008 |
| JP | 2009186794 | A | | 8/2009 |
| JP | 2015-049278 | A | | 3/2015 |
| JP | 2015053163 | A | | 3/2015 |
| JP | 2016-177232 | A | | 10/2016 |
| JP | 2017-531840 | A | | 10/2017 |
| KR | 20140027812 | A | | 3/2014 |
| KR | 20160008951 | A | | 1/2016 |
| KR | 20170039655 | A | | 4/2017 |
| KR | 20170065609 | A | | 6/2017 |
| KR | 2019-0086221 | A | | 7/2019 |
| KR | 20190086220 | A | | 7/2019 |
| KR | 20190108420 | A | | 9/2019 |
| WO | 2007-029032 | A1 | | 3/2007 |

OTHER PUBLICATIONS

Dr. Rudiger Paschotta: "Encyclopedia of Laser Physics and Technology—volume Bragg gratings, bulk, fabrication, photosensitive glass, typical properties, applications, wavelength stabilization, laser diode, beam combining", Jul. 31, 2016, 3 pages, XP055358358, Retrieved from the Internet: URL:https://www.rp-photonics.com/volume_bragg_gratings.html [retrieved on Mar. 23, 2017].

Extended European Search Report including Written Opinion for Application No. 20874544.8 dated May 11, 2022, pp. 1-8.

Search Report dated Feb. 21, 2023 from the Office Action for Chinese Application No. 202080028571.X issued Feb. 24, 2023, 2 pages. [See p. 1, categorizing the cited references].

* cited by examiner

[FIG. 1]
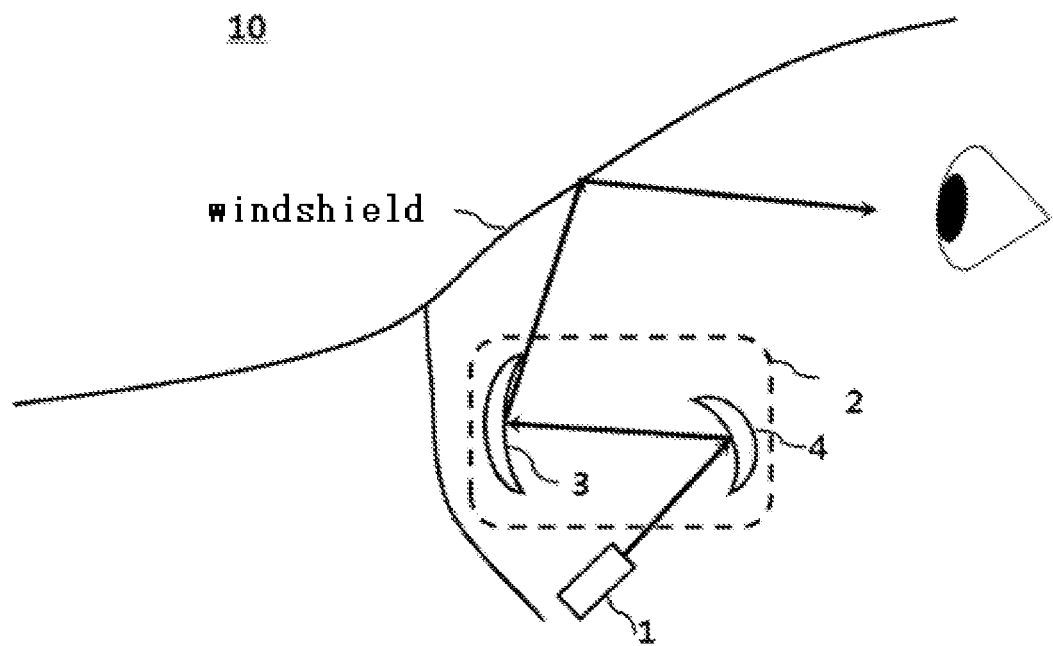

[FIG. 2]
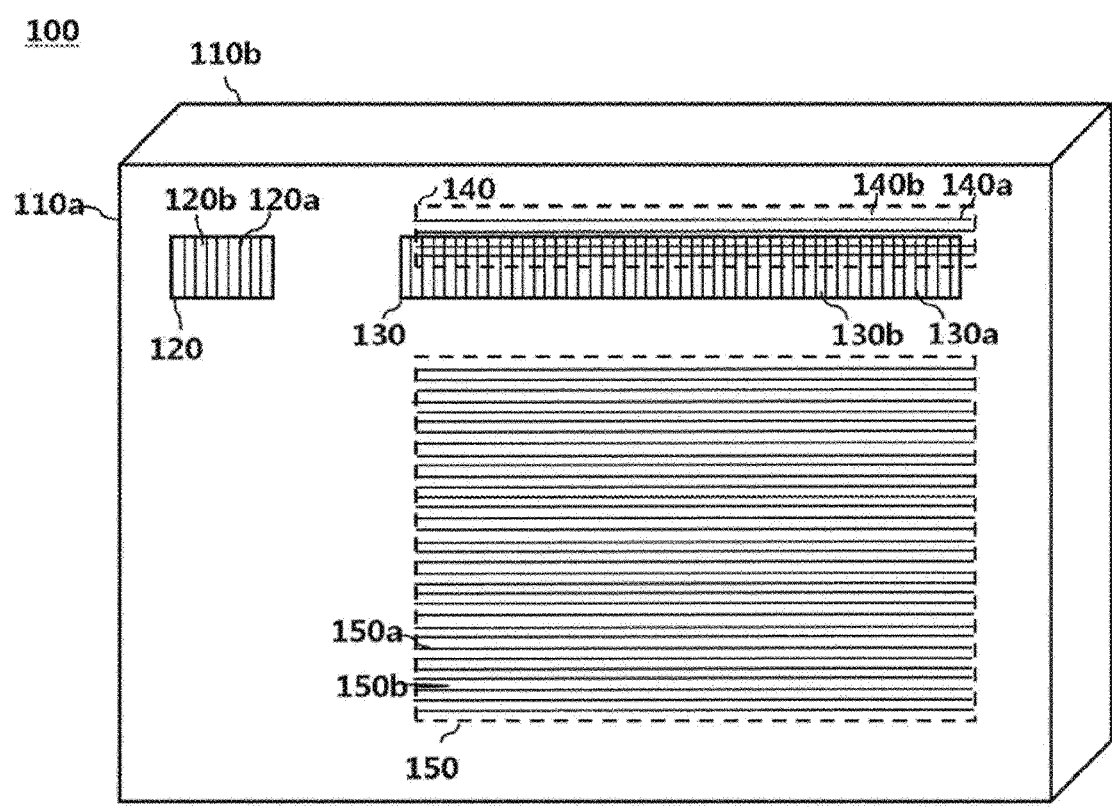

[FIG. 3]
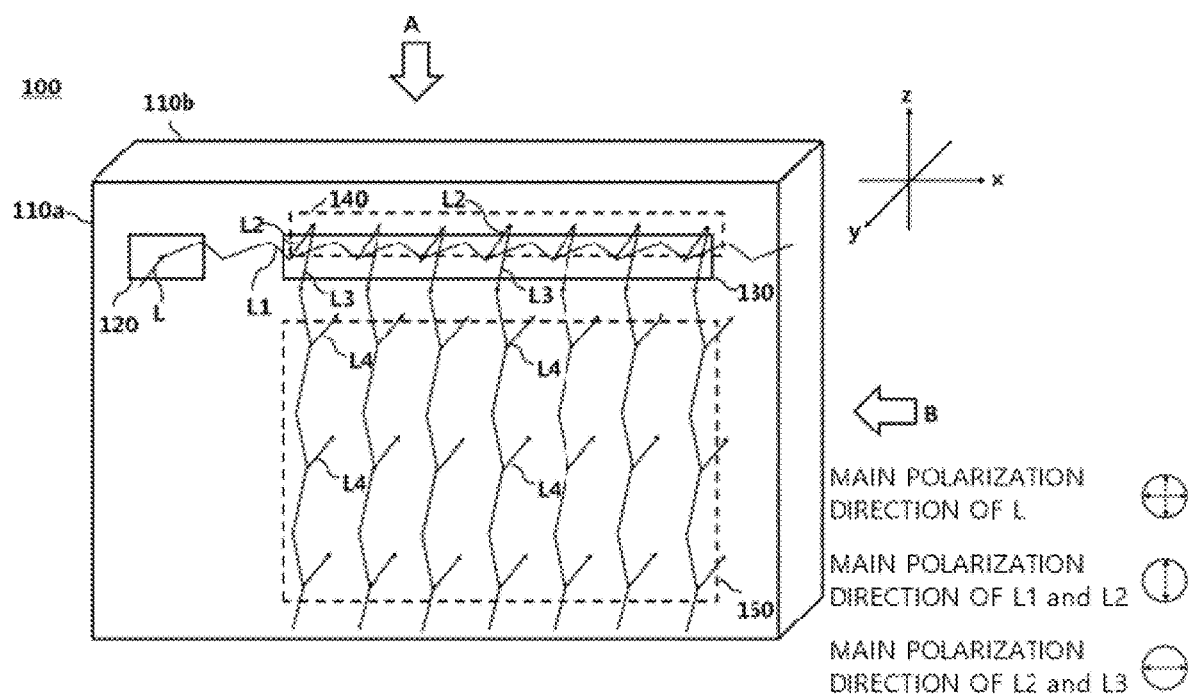

[FIG. 4]
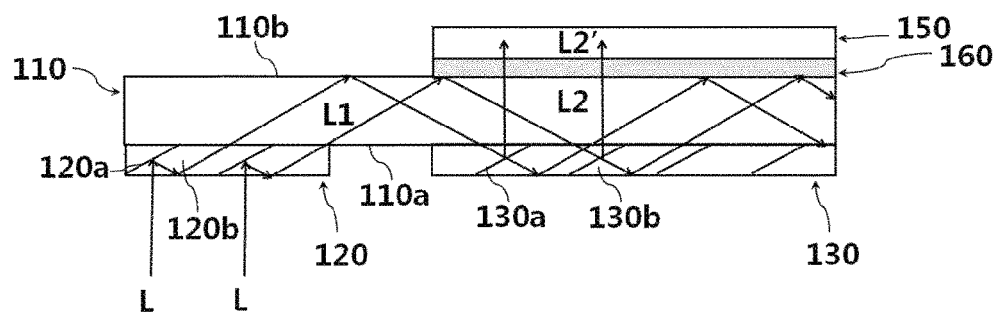
[FIG. 5]
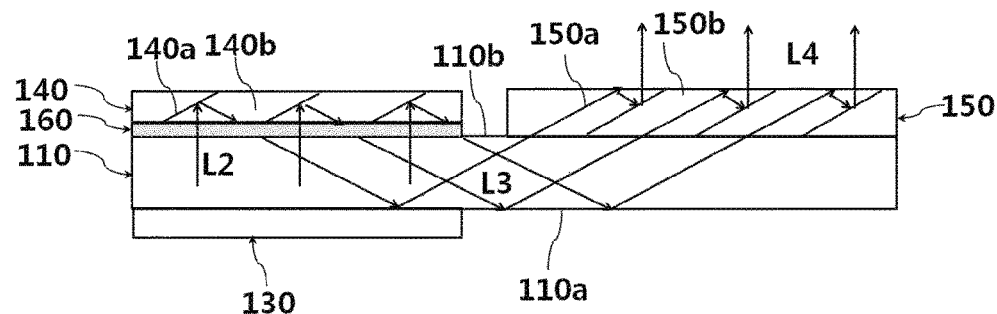

HOLOGRAPHIC LIGHT GUIDE PLATE

CROSS-REFERENCE TO RELATED APPLICATIONS

This application is a national phase entry under 35 U.S.C. § 371 of International Patent Application No. PCT/KR2020/013586, filed on Oct. 6, 2020, published in Korean, which claims priority from Korean Patent Application No. 10-2019-0124013 filed on Oct. 7, 2019, the disclosures of which are hereby incorporated herein by reference.

TECHNICAL FIELD

The present invention relates to a holographic waveguide.

BACKGROUND ART

FIG. 1 is a view schematically illustrating a general vehicle head-up display (HUD) system.

The general vehicle head-up display (HUD) system 10 may include a display 1 that generates and outputs an image and an optical system 2 that directs the image toward a vehicle windshield.

The optical system 2 uses a plurality of mirrors 3 and 4 as illustrated in FIG. 1 in order to reduce the total volume of the head-up display (HUD) system 10 while securing an optical path between the display 1 and the windshield.

Although the plurality of mirrors 3 and 4 are used as above, there is a limitation in reducing the total volume of the head-up display (HUD) system 10 to about 10 L due to distances to be secured between the display 1 and the plurality of mirrors 3 and 4.

In such a head-up display (HUD) system, it is difficult to form a wide eye motion box (EMB), which is an area where an image can be visibly recognized by a driver through the windshield. Therefore, the driver needs to inconveniently and directly adjust angles between the plurality of mirrors 3 and 4 such that the image can reach a limited range of the windshield in consideration of the visual axis of the pupil of the driver and the viewing angle of the image.

Furthermore, in the related art, in order to expand the eye motion box, incident light is expanded in a vertical direction using a first waveguide and then is expanded in a horizontal direction using a second waveguide, that is, the incident light is expanded in the vertical direction and the horizontal direction using the two waveguides. However, in the case of using the two waveguides, there is a limitation in structurally reducing the volume. Furthermore, the two waveguides need to be precisely arranged such that light emitted from the first waveguide is incident at an appropriate position of the second waveguide. Therefore, precision is required in the manufacturing process, resulting in an increase in the manufacturing cost and the manufacturing time.

The background art described above is technology information, which has been possessed by the present inventors for deriving embodiments of the present invention or acquired in the process of deriving the embodiments of the present invention, and it may not be necessarily said that the background art is a publicly-known technology disclosed to the general public prior to the filing of the application for the embodiments of the present invention.

DISCLOSURE

Technical Problem

Embodiments of the present invention intend to provide a holographic waveguide applicable to a head-up display.

Problems to be solved by the present invention are not limited to the aforementioned problems, and the other unmentioned problems will be clearly understood by those skilled in the art from the following description.

Technical Solution

An embodiment according to an aspect of the present invention provides a holographic waveguide including a light guide unit configured to guide lights; a first holographic optical element disposed on one surface or the other surface of the light guide unit such that a light output from a light source is input and guided on the light guide unit and configured to diffract the input light; a second holographic optical element disposed on any one of the one surface and the other surface of the light guide unit, and configured to receive the light diffracted by the first holographic optical element and guided through the light guide unit and to direct a part of the received light to the other one of the one surface and the other surface of the light guide unit by diffraction; a third holographic optical element disposed on a surface opposite to the surface of the light guide unit on which the second holographic optical element is disposed, and configured to receive lights diffracted by the second holographic optical element and to guide the received lights to areas, which are different from areas where the first and second holographic optical elements are disposed, on the light guide unit by diffraction; and a fourth holographic optical element configured to receive a light diffracted by the third holographic optical element, and to allow the received light to be output from the light guide unit by diffraction.

In the present embodiment, each of the first holographic optical element and the second holographic optical element may include a pattern in which a high refractive part and a low refractive part are alternately disposed along a first direction, and each of the third holographic optical element and the fourth holographic optical element may include a pattern in which a high refractive part and a low refractive part are alternately disposed along a second direction perpendicular to the first direction.

In the present embodiment, the second holographic optical element may be configured such that a diffraction efficiency by the pattern thereof increases along the first direction.

In the present embodiment, the third holographic optical element may be configured such that a diffraction efficiency by the pattern thereof is substantially uniform along the first direction within an area.

In the present embodiment, the fourth holographic optical element may be configured such that a diffraction efficiency by the pattern thereof increases along the second direction.

In the present embodiment, a phase delay film may be disposed between the second holographic optical element and the third holographic optical element.

In the present embodiment, the phase delay film may be disposed between the light guide unit and the third holographic optical element.

Advantageous Effects

The holographic waveguide according to embodiments of the present invention can contribute to downsizing a head-up display.

Furthermore, the holographic waveguide has the advantage of being able to display an image while maintaining high luminance.

BRIEF DESCRIPTION OF DRAWINGS

FIG. 1 is a view schematically illustrating a general vehicle head-up display system.

FIG. 2 is a view schematically illustrating a holographic waveguide according to one embodiment of the present invention.

FIG. 3 is a view schematically illustrating optical paths through the holographic waveguide illustrated in FIG. 2 and main polarization directions on the optical paths.

FIG. 4 is a view illustrating the holographic waveguide illustrated in FIG. 3 which is viewed from side A.

FIG. 5 is a view illustrating the holographic waveguide illustrated in FIG. 3 which is viewed from side B.

MODE FOR INVENTION

The present invention will become apparent by reference to the following detailed description in conjunction with the accompanying drawings. However, the present invention is not limited to such embodiments and may be realized in various forms. The embodiments to be described below are nothing but the ones provided to bring the disclosure of the present invention to perfection and assist those skilled in the art to which the present invention pertains to completely understand the scope of the present invention. The present invention is defined only by the scope of the appended claims. The terminology used herein is for the purpose of describing embodiments only and is not intended to limit the present invention. As used herein, the singular forms "a", "an" and "the" are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements. The terms such as first and second may be used to describe various components, but the components are not limited by the terms. The terms are used only to distinguish one component from another component.

In the present specification, the term "light guide unit" may be defined as a structure for guiding lights in an interior by using total internal reflection. The condition for the total internal reflection is that the refractive index of the light guide unit needs to be larger than that of a surrounding medium adjacent to the surface of the light guide unit. The light guide unit may be formed of a glass and/or plastic material and may be transparent or translucent. The light guide unit may be formed in various layouts in a plate type. The term "plate" means a three-dimensional structure having a predetermined thickness between one surface and the other surface on the opposite side thereto, and the one surface and the other surface may be substantially flat planes, but at least one of the one surface and the other surface may be formed to be curved in one dimension or two dimensions. For example, the plate-type light guide unit may be curved in one dimension, so that one surface and/or the other surface thereof may have a shape corresponding to some of side surfaces of a cylinder. However, preferably, a curvature formed by its curving has a radius of curvature large enough to facilitate total internal reflection in order to guide lights on the light guide unit.

In the present specification, the term "holographic optical element" may refer to a holographic grating pattern in which a high refractive part and a low refractive part are alternately disposed along a predetermined direction, and an optical path of light reaching the holographic optical element may be changed due to its diffraction. Such a holographic grating pattern may be recorded by interference of a plurality of lasers on a photosensitive material such as a photopolymer. The holographic optical element may be understood as a structure for changing an optical path by diffracting lights on the light guide unit by being disposed on one surface or the other surface of the light guide unit.

In the present specification, the holographic optical element may include the holographic grating pattern in which the high refractive part and the low refractive part are alternately disposed along the predetermined direction, and the longitudinal direction of the holographic grating pattern may be defined as a direction perpendicular to the direction in which the high refractive part and the low refractive part are alternately disposed. It may refer to a holographic grating pattern in which a high refractive part and a low refractive part are alternately disposed along a predetermined direction, and an optical path of light reaching the holographic optical element may be changed due to its diffraction. Such a holographic grating pattern may be recorded by interference of a plurality of lasers on a photosensitive material such as a photopolymer. The holographic optical element may be understood as a structure for changing an optical path by diffracting lights on the light guide unit by being disposed on one surface or the other surface of the light guide unit.

In the present specification, an optical path of a light totally internally reflected on the light guide unit may be changed due to its partial diffraction by the holographic optical element, and the rest may be totally reflected along the optical path before the diffraction, and the term "diffraction efficiency" may refer to a value obtained by dividing the light amount of the diffracted light whose optical path has been changed due to the diffraction by the light amount immediately before the diffraction.

FIG. 2 is a view schematically illustrating a holographic waveguide according to one embodiment of the present invention, and FIG. 3 is a view schematically illustrating optical paths through the holographic waveguide illustrated in FIG. 2 and main polarization directions on the optical paths.

FIG. 4 is a view illustrating the holographic waveguide illustrated in FIG. 3 which is viewed from side A, and FIG. 5 is a view illustrating the holographic waveguide illustrated in FIG. 3 which is viewed from side B.

Referring to FIG. 2 to FIG. 5, a holographic waveguide 100 may include a light guide unit 110, a first holographic optical element 120, a second holographic optical element 130, a third holographic optical element 140, a fourth holographic optical element 150, and a phase delay film 160.

The light guide unit 110 may be configured to guide lights in an interior by using total internal reflection.

The first holographic optical element 120 may be disposed on one surface 110a or the other surface 110b of the light guide unit 110 such that a light L output from a light source (not illustrated) may be input and guided on the light guide unit 110, and may be configured to diffract the input light L. The light source may receive an electrical signal having image information and output an image display light for the image information. As the light source, for example, a liquid crystal display (LCD) panel, a display panel composed of organic light emitting diodes (OLEDs) (hereinafter, an organic light emitting display panel), or a display device such as a laser beam scan projector may be used. FIG. 2 illustrates one embodiment in which the first holographic optical element 120 is disposed on the one surface 110a of the light guide unit 110.

The first holographic optical element 120 may include a holographic grating pattern in which a high refractive part 120a and a low refractive part 120b are alternately disposed along a predetermined direction. The direction in which the high refractive part 120a and the low refractive part 120b of the first holographic optical element 120 are alternately disposed is defined as a first direction, and may be an x axis direction based on FIG. 2. The longitudinal direction of the holographic grating pattern of the first holographic optical element 120 may be a second direction perpendicular to the first direction, that is, a z axis direction based on FIG. 2.

The second holographic optical element 130 may be disposed on any one of the one surface 110a and the other surface 110b of the light guide unit 110, and may be configured to receive a light L1 diffracted by the first holographic optical element 120 and guided through the light guide unit 110 and to direct a part of the received light to the other one of the one surface 110a and the other surface 110b of the light guide unit 110 by diffraction. In one embodiment, the second holographic optical element 130 is disposed spaced apart from the first holographic optical element 120 by a predetermined interval along the first direction, and FIG. 2 to FIG. 5 illustrate that the second holographic optical element 130 is disposed on the one surface 110a of the light guide unit 110; however, the present disclosed is not limited thereto.

The second holographic optical element 130 may include a holographic grating pattern in which a high refractive part 130a and a low refractive part 130b are alternately disposed along a predetermined direction. The direction in which the high refractive part 130a and the low refractive part 130b of the second holographic optical element 130 are alternately disposed may be the first direction as in the case of the first holographic optical element 120, that is, the x axis direction based on FIG. 2. The longitudinal direction of the holographic grating pattern of the second holographic optical element 130 may be the second direction perpendicular to the first direction, that is, the z axis direction based on FIG. 2.

Meanwhile, based on the embodiment illustrated in FIG. 2 to FIG. 5, the second holographic optical element 130 is configured to receive the light L1 diffracted by the first holographic optical element 120 and guided through the light guide unit 110, to direct a part of the light L1 to the other surface 110b of the light guide unit 110 by diffraction, and to guide the rest of the light L1 by total reflection on the light guide unit 110 through an existing optical path. Specifically, the light L1 initially received by the second holographic optical element 130 is partially diffracted at each point separated by predetermined intervals along a specific direction, for example, the first direction, diffracted lights L2 are directed to the other surface 110b of the light guide unit 110, and the remaining lights are totally reflected and guided in the light guide unit 110 along the first direction, so that one-dimensional expansion may be achieved in the end.

The third holographic optical element 140 may be disposed on a surface opposite to the surface on which the second holographic optical element 130 is disposed, and may be configured to receive the diffracted light L2 and a diffracted light L2' from the second holographic optical element 130 and to guide the received lights L2 and L2' to areas, which are different from the areas where the first and second holographic optical elements 120 and 130 are disposed, on the light guide unit 110 by diffraction. In one embodiment, since the second holographic optical element 130 is disposed on the one surface 110a of the light guide unit 110, the third holographic optical element 140 may be disposed on the other surface 110b of the light guide unit 110, which is a surface opposite to the one surface 110a.

The third holographic optical element 140 may include a holographic grating pattern in which a high refractive part 140a and a low refractive part 140b are alternately disposed along a predetermined direction. The direction in which the high refractive part 140a and the low refractive part 140b of the third holographic optical element 140 are alternately disposed may be the second direction perpendicular to the first direction in which the holographic grating patterns of the first and second holographic optical elements 120 and 130 are arranged, that is, the z axis direction based on FIG. 2. The longitudinal direction of the holographic grating pattern of the third holographic optical element 140 may be the first direction perpendicular to the second direction, that is, the x axis direction based on FIG. 2.

The fourth holographic optical element 150 may be configured to receive diffracted lights L3 from the third holographic optical element 140, and to allow the received lights L3 to be output from the light guide unit 110 by diffraction.

The fourth holographic optical element 150 may be disposed on any one of the one surface 110a and the other surface 110b of the light guide unit 110, and FIG. 2 to FIG. 5 illustrate one embodiment in which the fourth holographic optical element 150 is disposed on the other surface 110b of the light guide unit 110, which is the side on which the third holographic optical element 140 is disposed.

The fourth holographic optical element 150 may include a holographic grating pattern in which a high refractive part 150a and a low refractive part 150b are alternately disposed along a predetermined direction. The direction in which the high refractive part 150a and the low refractive part 150b of the fourth holographic optical element 150 are alternately disposed may be the second direction as in the case of the third holographic optical element 140, that is, the z axis direction based on FIG. 2. The longitudinal direction of the holographic grating pattern of the fourth holographic optical element 150 may be the first direction perpendicular to the second direction, that is, the x axis direction based on FIG. 2.

Meanwhile, based on the embodiment illustrated in FIG. 2 to FIG. 5, the fourth holographic optical element 150 is configured to receive the lights L3 diffracted by the third holographic optical element 140 and guided through the light guide unit 110, to allow a part of the lights L3 to be output from the light guide unit 110 by diffraction, and to guide the rest of the lights L3 by total reflection on the light guide unit 110 through an existing optical path. Specifically, the lights L3 initially received by the fourth holographic optical element 150 are partially diffracted at each point separated by predetermined intervals along a specific direction, for example, the second direction, diffracted lights L4 are output from the light guide unit 110, and the remaining lights are totally reflected and guided in the light guide unit 110 along the second direction, so that one-dimensional expansion may be achieved in the end. Meanwhile, the lights L3 initially received by the fourth holographic optical element 150 are lights which have already expanded by the second holographic optical element 130 along the first direction and have reached the fourth holographic optical element 150 through the third holographic optical element 140. Since such lights L3 are expanded through the fourth holographic optical element 150 along the second direction, the lights L4 output from the light guide unit 110 through the fourth holographic optical element 150 are in a state of being two-dimensionally expanded compared to the light L received by the first holographic optical element 120 from the light source. As the two-dimensional expansion is implemented over a wide area as above, the eye motion box (EMB), which is an area where an observer's pupil can be disposed such that output lights can be visually recognized, can be widely formed.

In the present embodiment, preferably, the second holographic optical element 130 is configured such that a diffraction efficiency by the holographic grating pattern thereof increases along the first direction. The second holographic optical element 130 may be configured such that the diffraction efficiency by the holographic grating pattern thereof gradually increases between 10% to 100%. The light L1 received by the second holographic optical element 130 from the first holographic optical element 120 is totally reflected in the first direction, in which the holographic grating patterns are arranged on the light guide unit 110, as a main direction. Some of the lights L2 are divided along with diffraction on the total reflection path by the holographic grating pattern, so that the optical path thereof is directed toward the third holographic optical element 140. As a consequence, the amounts of lights decrease along the total reflection path with the first direction as the main direction. Accordingly, even though the amounts of lights reaching the holographic grating pattern decrease along the total reflection path, when the second holographic optical element 130 is configured such that the diffraction efficiency thereof increases along the first direction, the amounts of the lights L2 diffracted through the holographic grating pattern of the second holographic optical element 130 and directed toward the third holographic optical element 140 may be similar to each other. Meanwhile, the diffraction efficiency of the holographic grating pattern is correlated with the thickness and/or height of the high refractive part. That is, the diffraction efficiency by the holographic grating pattern arranged along a predetermined direction may increase by increasing the thickness and/or height of the high refractive part along the predetermined direction.

In the present embodiment, preferably, the third holographic optical element 140 is configured such that a diffraction efficiency by the holographic grating pattern thereof is substantially uniform along the first direction within an area, and the diffraction efficiency is preferably 80% or more. In the third holographic optical element 140, the holographic grating pattern is arranged along the second direction, and lights may be substantially directed along the second direction by diffraction to an area where the forth holographic optical element 150 is disposed. Meanwhile, the lights L2 and L2' received by the third holographic optical element 140 from the second holographic optical element 130 have a similar light amount as described above, and are not totally reflected in the first direction by the holographic grating pattern of the third holographic optical element 140. Thus, it is necessary to maintain the light amounts of the lights L3 by diffraction to be similar to each other by allowing the diffraction efficiency to be uniform within the area along the first direction. Meanwhile, diffraction efficiency by the holographic grating pattern arranged along a predetermined direction may be substantially uniform by allowing the thicknesses and/or heights of the high refractive part to be substantially the same along the predetermined direction.

In the present embodiment, preferably, the fourth holographic optical element 150 is configured such that a diffraction efficiency by the holographic grating pattern thereof increases along the second direction. The fourth holographic optical element 150 may be configured such that the diffraction efficiency by the holographic grating pattern gradually increases between 10% to 100%. The light L3 received by the fourth holographic optical element 150 from the third holographic optical element 140 is totally reflected in the second direction, in which the holographic grating patterns are arranged on the light guide unit 110, as a main direction. Some of the lights L4 are divided along with diffraction on the total reflection path by the holographic grating pattern, so that the optical path thereof is formed in a direction in which the lights L4 are output from the light guide unit 110. As a consequence, the amounts of lights decrease along the total reflection path with the second direction as the main direction. Accordingly, even though the amounts of lights reaching the holographic grating pattern decrease along the total reflection path, when the fourth holographic optical element 150 is configured such that the diffraction efficiency thereof increases along the second direction, the amounts of the lights L4 diffracted through the holographic grating pattern of the fourth holographic optical element 150 and output from the light guide unit 110 may be similar to each other.

Meanwhile, the diffraction efficiency of the light received by the holographic optical element increases as the polarization direction of the light is parallel to the longitudinal direction of the holographic grating pattern in the holographic optical element.

Specifically, the first holographic optical element 120 and the second holographic optical element 130 mainly diffract a light polarized in a direction parallel to the second direction because the longitudinal directions of the holographic grating patterns thereof are the second direction. Accordingly, the main polarization directions of the light L1 directed to the second holographic optical element 130 via the first holographic optical element 120 and the light L2 directed to the third holographic optical element 140 via the second holographic optical element 130 may be the second direction.

Meanwhile, the third holographic optical element 140 mainly diffracts a light polarized in a direction parallel to the first direction because the longitudinal direction of the holographic grating pattern thereof is the first direction perpendicular to the second direction. However, since the main polarization direction of the light L2 directed to the third holographic optical element 140 via the second holographic optical element 130 is the second direction, the amount of a light that can be diffracted by the holographic grating pattern of the third holographic optical element 140 is significantly reduced.

In this regard, in the present embodiment, by disposing the phase delay film 160 between the second holographic optical element 130 and the third holographic optical element 140, it is possible to switch the main polarization direction of the light L2 directed to the third holographic optical element 140 via the second holographic optical element 130 from the second direction to the first direction. Here, the phase delay film 160 may be disposed between the light guide unit 110 and the third holographic optical element 140. As the phase delay film 160, a λ/4 phase delay film, a λ/2 phase delay film, and the like may be used; however, the present invention is not limited thereto and any configuration may be used as long as it can switch the polarization direction from the second direction to the first direction.

The light L2', whose main polarization direction is switched to the first direction by the phase delay film 160, reaches the third holographic optical element 140, and the third holographic optical element 140 mainly diffracts a light polarized in a direction parallel to the first direction. Thus, optical loss is minimized and the light L2' can be directed toward the fourth holographic optical element 150. With this, it is possible to output an image from the light guide unit 110 while maintaining high light luminance.

The holographic waveguide in accordance with an embodiment of the present invention is available as a waveguide through diffraction while minimizing optical loss, thereby contributing to downsizing a head-up display.

Although the present invention has been described in relation to the preferred embodiment described above, various corrections or modifications can be made without departing from the subject matter and scope of the invention. Therefore, the appended claims will include such corrections or modifications as long as they belong to the subject matter of the present invention.

The invention claimed is:

1. A holographic waveguide comprising:
a light guide unit configured to guide an input light from a light source, the light guide unit having first and second opposite surfaces;
a first holographic optical element disposed on the first surface or the second surface of the light guide unit, the first holographic optical element being configured to diffract the input light;
a second holographic optical element disposed on the first surface of the light guide unit, and configured to receive a light diffracted by the first holographic optical element and guided through the light guide unit, the second holographic optical element being configured to direct a part of the light diffracted by the first holographic optical element to the second surface of the light guide unit by diffraction;
a third holographic optical element disposed on the second surface, and configured to receive a light diffracted by the second holographic optical element, the third holographic optical element being configured to guide the light diffracted by the second holographic optical element to first areas of the light guide unit, which are different from second areas of the light guide unit where the first and second holographic optical elements are disposed, on the light guide unit by diffraction; and
a fourth holographic optical element configured to receive a light diffracted by the third holographic optical element, the fourth holographic optical element configured to receive the light diffracted by the third holographic optical element and to output a part of the light diffracted by the third holographic optical element out of the light guide unit by diffraction,
wherein each of the first holographic optical element and the second holographic optical element includes a first pattern in which a high refractive part and a low refractive part are alternately disposed along a first direction, and
each of the third holographic optical element and the fourth holographic optical element includes a second pattern in which a high refractive part and a low refractive part are alternately disposed along a second direction perpendicular to the first direction.

2. The holographic waveguide according to claim 1, wherein the second holographic optical element is configured such that a diffraction efficiency of the first pattern thereof increases along the first direction.

3. The holographic waveguide according to claim 1, wherein the third holographic optical element is configured such that a diffraction efficiency of the second pattern thereof is substantially uniform along the first direction within a third area of the light guide unit.

4. The holographic waveguide according to claim 1, wherein the fourth holographic optical element is configured such that a diffraction efficiency of the second pattern thereof increases along the second direction.

5. The holographic waveguide according to claim 1, wherein a phase delay film is disposed between the second holographic optical element and the third holographic optical element.

6. The holographic waveguide according to claim 5, wherein the phase delay film is disposed between the light guide unit and the third holographic optical element.

* * * * *